Sept. 19, 1967 G. BATE ETAL 3,342,632

MAGNETIC COATING

Filed Aug. 5, 1964 3 Sheets-Sheet 1

INVENTORS
GEOFFREY BATE
DENNIS E. SPELIOTIS
JOHN R. MORRISON

BY George O. Saile
ATTORNEY

United States Patent Office 3,342,632
Patented Sept. 19, 1967

3,342,632
MAGNETIC COATING

Geoffrey Bate and Dennis E. Speliotis, Poughkeepsie, and John R. Morrison, Wappingers Falls, N.Y., assignors to International Business Machines Corporation, New York, N.Y., a corporation of New York Filed Aug. 5, 1964, Ser. No. 387,589
18 Claims. (Cl. 117—217)

This invention relates to vacuum deposited ferromagnetic films having high coercivities, and more particularly to a method for producing magnetic recording surfaces by a vacuum deposition process and for providing an improved magnetic recording surface.

Magnetic recording devices in the form of a thin film of magnetic material on a substrate such as a tape, drum, disc, loop surface and the like are extensively used in computer and data processing systems. The most extensively used magnetic coating is a finely divided ferric oxide dispersion in a thermoplastic binder composition. Electrodeposited ferromagnetic films such as cobalt-nickel alloy films have also found use where high-density data storage is required. Electroles plated cobalt or a cobalt-nickel alloy film have also found limited use as a magnetic layer for magnetic recording devices.

Vacuum deposition of ferromagnetic metallic layers have been used extensively in the production of low coercivity, or soft magnetic layers, which are useful as bistable devices. Vacuum evaporation techniques have been suggested for the production of high coercivity or hard magnetic films for magnetic recording devices. However, until the present invention, magnetic films having sufficiently high coercivity for a magnetic recording device have not been made.

A ferromagnetic metal coating is superior to the widely used magnetic ferric oxide type of magnetic coating. Magnetic oxide is dispersed in a thermoplastic binder composition which makes up at least 50 percent of the volume of the coating. It is therefore necessary that a considerable thickness of coating be built up on the substrate in order to obtain a desired level of output. Recording mediums of this magnetic oxide type also are found to have a rough or abrasive surface and do not provide the optimum conformity to the magnetic recording head. The bit density storage capacity of magnetic oxide mediums is also quite low in comparison to the ferromagnetic metal coated recording devices.

For a magnetic recording to be a permanent record, the demagnetizing field, $H_d$, must be somewhat less than the coercivity, $H_c$. At high recording densities, such as above 5000 bits per inch, when using metallic ferromagnetic films, the demagnetizing field is greater than 100 oersteds. The obvious solution to the problem is to increase the coercivity of the metal film substantially above the 100-oersted demagnitizing field. There is, however, no prior art method available for vacuum evaporating a ferromagnetic film which has a coercivity substantially above 100 oersteds.

It is thus an object of the invention to provide a method for vacuum depositing high coercivity magnetic films having optimum magnetic properties.

It is a further object of this invention to provide a method for vacuum depositing a magnetic cobalt, iron or nickel thin film having a controlled coercivity of greater than 100 oersteds.

It is another object of this invention to provide a magnetic recording member composed of a ferromagnetic metal or alloy which has a controlled coercivity of above 100 oersteds together with other satisfactory magnetic properties.

These and other objects are accomplished in accordance with the broad aspects of the present invention by providing a method which allows the deposition by vacuum evaporation techniques of a high coercivity magnetic recording metallic layer. A body of ferromagnetic metal is heated to a temperature sufficiently high to volatilize the metal within the vacuum chamber. The evaporated metal is directed and condensed onto the suitable substrate at an angle of incidence of greater than about 45 degrees from the normal to substrate. The angle of incidence is the angle between the arrival direction and the substrate normal. The condensed metal on the substrate is then cooled to room temperature.

The resulting film has a coercivity substantially greater than 100 oersteds depending upon the particular ferromagnetic metal or alloy used. Coercivities greater than 1000 oersteds have been recorded for films made according to the present procedure. This is contrasted with film coercivities of less than 100 oersteds for prior art normal angle of incidence vacuum evaporation methods.

The foregoing and other objects, features and advantages of the present invention will be apparent from the following more particular description of the preferred embodiments of the invention as illustrated in the accompanying drawings:

Figure 1:
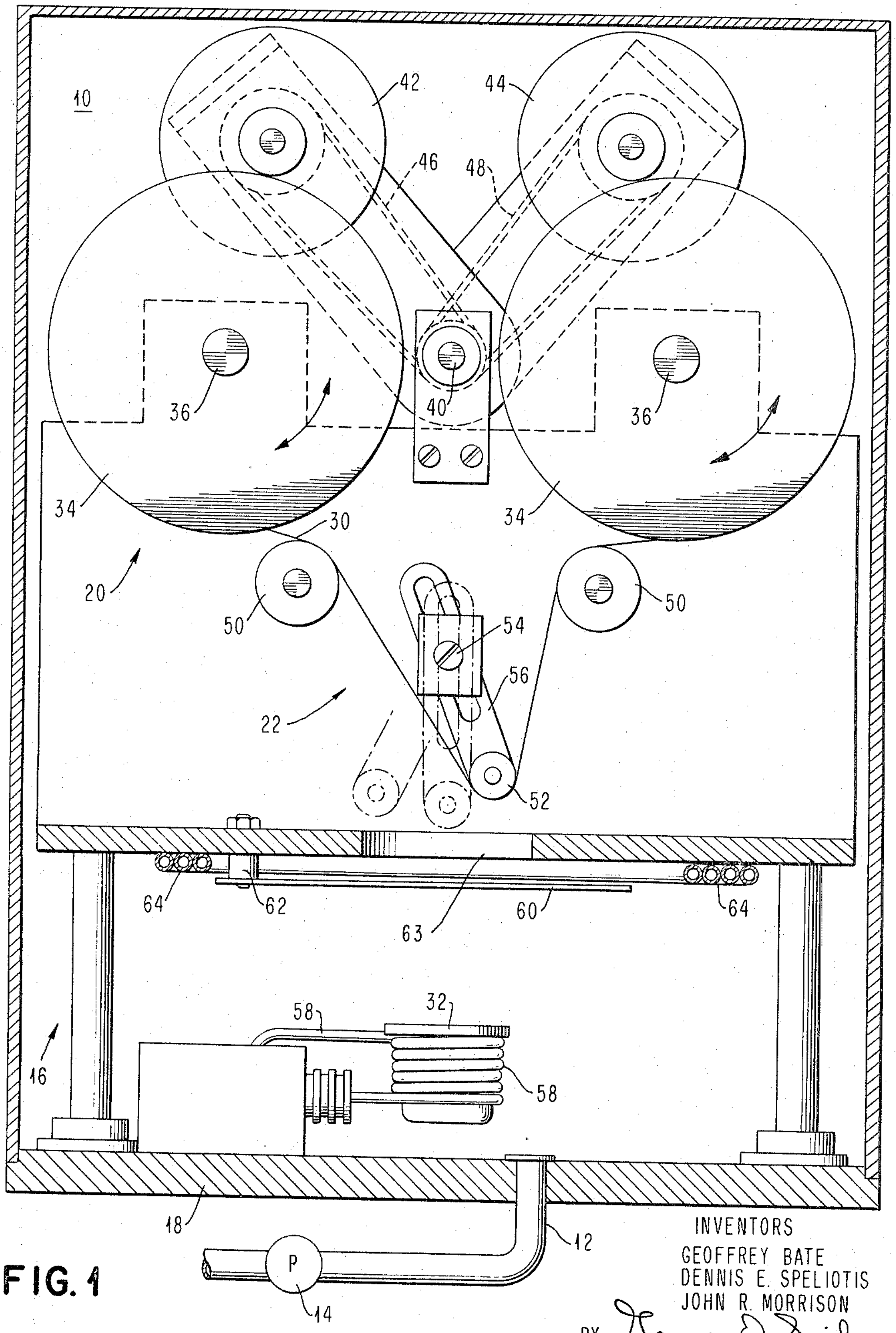
FIGURE 1 illustrates an apparatus useful in performing the vacuum evaporation method of the present invention.

Referring now more particularly to FIGURE 1 there is shown an apparatus for producing a high coercivity magnetic recording tape by vacuum evaporation. The substrate to be coated is located in vacuum chamber 10 which is connected by means of pipe 12 to a pump 14 capable of creating the desired vacuum in the vacuum chamber. Within the chamber there is a supporting structure which is generally indicated as 16 which rests upon the base 18 of the vacuum chamber 10. The support structure 16 supports the means 20 for moving the tape to be coated and the means 22 for adjusting the angle of incidence of the vacuum deposit applied to the tape.

The means 20 for moving the tape 30 past the vessel 32 containing a mass of ferromagnetic metal to be evaporated includes a pair of tape reels 34 which are mounted on hubs 36 that are attached to the supporting structure 16. One of the reels 34 is loaded with uncoated tape of a suitable composition while the second reel is the empty take-up reel. The tape reels 34 are driven by a drive shaft 40 by means of motors 42 or 44 connected to the drive shaft 40 by belts 46 and 48. The tape reels may be driven in one direction or the other by means of motors 42 and 44 together with their mechanical linkages to the hubs 36. In this way the tape can be coated with several layers of vacuum deposited material without interrupting the vacuum in the vacuum chamber 10.

The tape 30 passes over idler rollers 50 and over means 22 for adjusting the angle of incidence of the volatilized ferromagnetic metal stream. The means 22 is illustrated as an adjustable idler roller 52 fixedly supported on a bolt 54, adjustable element 56. The idler roller 52 can be moved to any desired location within a wide range of locations by loosening the bolt 54, adjusting the element 56 to the desired location and simply tightening the bolt 54. The distance from the vessel 32 containing the molten metal is also adjustable by the means 22.

The body of ferromagnetic metal in the vessel 32 is made molten by means of heat supplied by the induction coil 58. The temperature is then increased by means of additional induction heating of the vessel 32 and the metal is volatilized in the direction of the tape 30. A shield 60 mounted on the supporting structure 16 by bolting means 62 acts to limit the area of the tape exposed to the condensation of the volatilized metal. Copper cooling coil 64 on the support structure maintains the supporting structure substantially at about room temperature. The shield 60 additionally shields the tape surface from undue heat exposure from the vessel 32 and its induction heater 58.

The ferromagnetic metals which may be used according to the method are the pure cabolt, iron or nickel, an alloy of cobalt and iron, or cobalt and iron alloys with nickel. The nickel-iron alloy between about 75 to 85 percent by weight nickel and about 25 to 15 percent by weight iron is excluded because of its extremely low coercivity characteristic. When nickel is alloyed with iron or cobalt, the resulting alloy has a decreased remanent moment and a decreased demagnetizing field.

FIGURES 2, 3, 4 and 5 are typical results from fundamental studies in vacuum deposition of cobalt and iron metals and alloys. They show the surprising discovery that the coercivity measured parallel to the incident plane of vacuum evaporated cobalt and iron films can be increased by condensing volatilized metal films onto suitable substrates at angles of incidence of greater than about 45 degrees from the normal to the substrate. The squareness ratio of remanent magnetization (magnetic moment per unit volume) $M_r$ to saturation magnetization $M_s$ also increases for these metals at increased angles of incidence. The studies from which these graphical illustrations were obtained were conducted in a bell jar vacuum system having an especially designed substrate holder consisting of 25 sites each of which holds a one centimeter diameter circle of polyethylene terephthalate. The sites were arranged at various known angles of incidence from the normal to the substrate, that is 45, 67, 80, 85 and 88 degrees. Five sites for each of these angles were fixed at the source to substrate distances of 4, 5, 6, 7 and 8 inches. Resistance heating of the metal to be evaporated was used wherein strips of metal were placed directly on a tungsten filament. The thicknesses and deposition rates were determined by measurement of the saturation magnetic moment, $M_s$, or using standard multiple-beam interferrometric methods. The thickness and deposition rate for the vacuum deposits of FIGURES 2 and 4 were 200 to 600 angstrom units and 20 to 50 angstroms per second, respectively. The thickness and deposition rate for the vacuum deposit of FIGURES 3 and 5 were 100 to 350 angstrom units and 10 to 60 angstroms per second, respectively.

Figure 2:
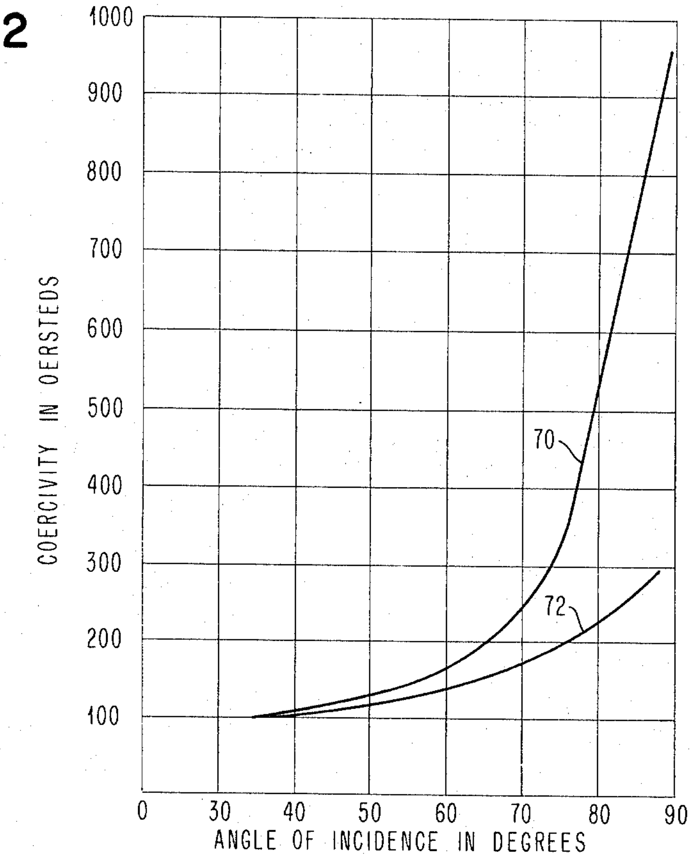
FIGURE 2 is a graphical representation showing the relationship between coercivity and angle of incidence for iron.
Figure 3:
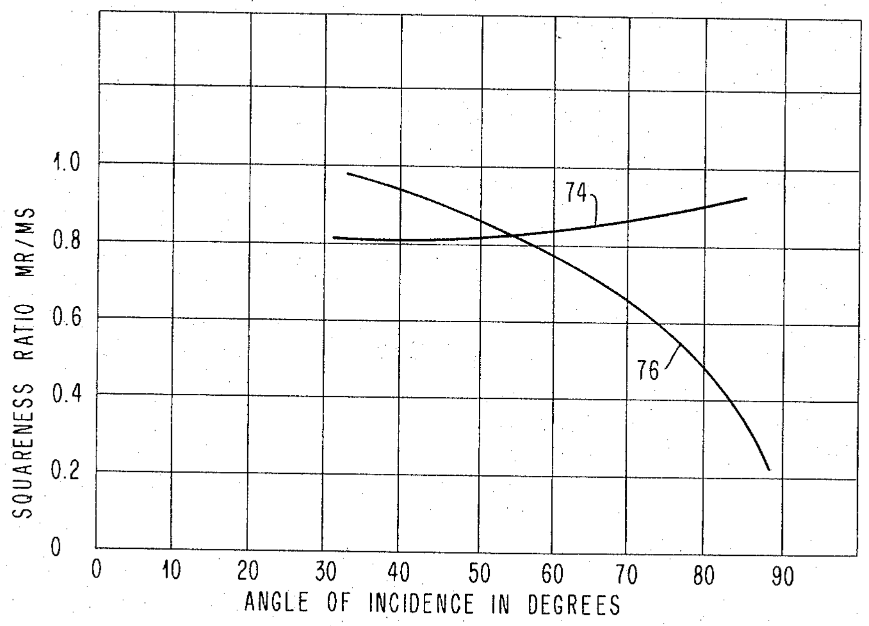
FIGURE 3 is a graphical illustration showing the relationship between the squareness ratio $M_r/M_s$ and the angle of incidence for iron.

FIGURES 2 and 3 show the results of iron vacuum magnetic coatings at angles of incidence of greater than 45 degrees from the normal to the substrate. The curve 70 represents the coercivity with angle of incidence variation found when the coercivity of the ferromagnetic layer was measured parallel to the incident plane. The curve 72 shows the change in coercivity with angle of incidence of the ferromagnetic layer, as measured perpendicular to the incident plane. The squareness ratio of remanent magnetization $M_r$ to saturation magnetization $M_s$ variation with angle of incidence is shown in FIGURE 3 where curve 74 is for measurements taken parallel to the incident plane and curve 76 for measuresments taken perpendicular to the incident plane.

Figure 4:
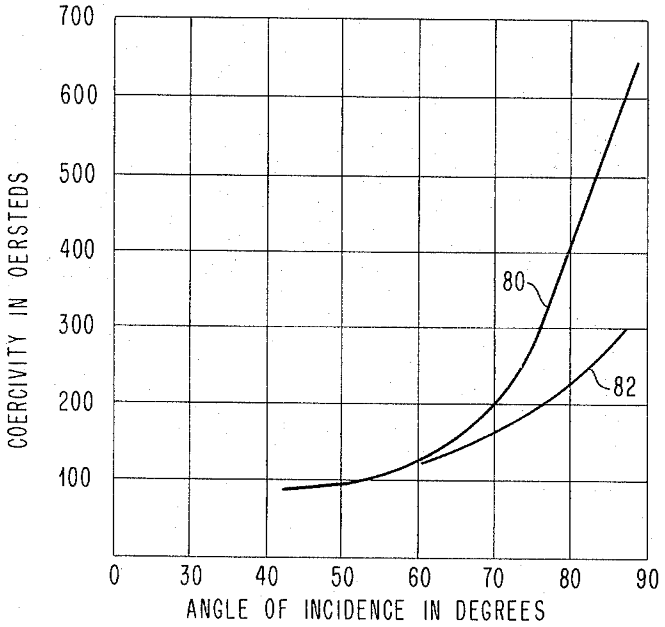
FIGURE 4 is a graphical illustration showing the relationship between coercivity and angle of incidence for cobalt.
Figure 5:
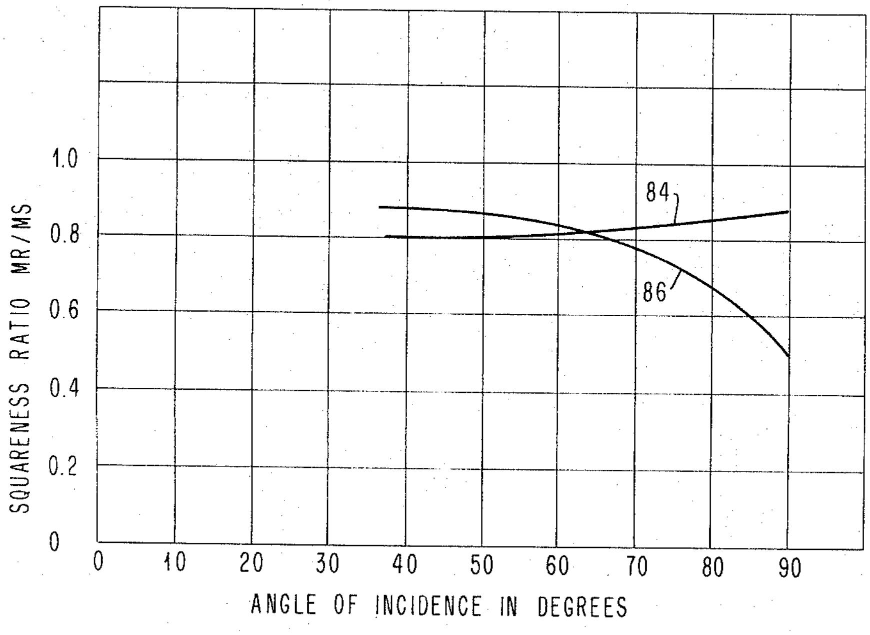
FIGURE 5 is a graphical illustration showing the relationship between the squareness ratio $M_r/M_s$ and the angle of incidence for cobalt.

FIGURES 4 and 5 show similar results with cobalt vacuum magnetic coatings at angles of incidence of greater than 45 degrees. Curves 80 and 84 are for measurements taken parallel to the incident plane. Curves 82 and 86 are for measurements taken perpendicular to the incident plane. It is seen from the FIGURES 2 and 4 that high coercivities approaching 1000 oersteds are obtainable by the angle of incidence vacuum deposition technique. Also the squareness ratio approaches the optimum number of 1.0 at these increased angles of incidence as observed from FIGURES 3 and 5.

Small amounts of non-ferromagnetic elements can be evaporated simultaneously with the ferromagnetic metal or alloy to produce a magnetic film containing impurity atoms within its body. The impurity atoms act to modify the film's magnetic properties and therefore can be used as a magnetic property control means. Sulfur has been used in this manner. Increasing amounts of sulfur of from about 0.5 to 4.0 percent by weight in magnetic films deposited at an angle of incidence greater than 45 degrees decreases the saturation moment $M_s$, and the squareness ratio $M_r/M_s$. Above about 4.0 percent sulfur in a magnetic film, the saturation moment and squareness ratio are outside of the usable limits for magnetic recording purposes. Sulfur at 0.5 percent by weight in ferromagnetic vacuum deposits produces a reduced coercivity in the film as compared to the un-sulfur modified film. However, further increases in the percent by weight sulfur in the film up to about 4.0 percent produces increased coercivity to approximately the value of the un-sulfur modified film.

It has been discovered, contrary to previous work with magnetic layers deposited by other techniques such as electroless deposition and electroplating, that the coercivity increases with thickness of the deposit under the conditions of the present vacuum deposition method. This effect has been observed up to about 5000 angstrom units. At high angles of incidence such as 80 degrees, a 50 percent increase in coercivity is obtained with a 50 percent increase in thickness. At lower angles of incidence such as 45 to 60 degrees the effect of thickness is less marked. The preferred thickness for the magnetic layer is 5 to $15 \times 10^{-3}$ emu, or 400 to 3000 angstrom units for a flexible magnetic record member such as a loop or elongated tape. Thicknesses much greater than 3000 angstrom units will make the magnetic layer brittle with a tendency to crack. The inertia of the tape will also increase with thickness. Films thinner than about 400 angstroms tend to have poor wear and corrosion characteristics.

Another technique for increasing the coercivity of cobalt and iron thin film is to cause the source of volatilized metal to evaporate the ferromagnetic metal in a series of bursts. Bursts of metal for 5 to 10 seconds can be readily provided by modulating the induction heating element of the vessel 32. While this technique causes increase in the coercivity of the deposit its effect is not nearly as marked as the angle of incidence and the thickness effects.

A two step vacuum deposition procedure with an intermediate air cooling step has been found to also significantly increase the coercivity of the deposited film. The film is allowed to cool to below about 60 degrees without exposure to an oxygen containing environment. Air is then admitted to the vacuum chamber while the temperature of the vacuum deposited layer is less than about 60 degrees. The film's exposure to air at a temperature above about 60 degrees produces a partially oxidized film which reduces the coercivity of the magnetic film. A second layer is then vacuum deposited over the first layer. This composite film has greater coercivity than a film of equal thickness deposited without the intervening cooling step.

The use of the basic high angle of incidence vacuum deposition method with or without one, two or all of the supplementary coercivity increasing methods allows the production of a wide range of high coercivity magnetic films of between about 100 and 1100 oersteds or higher. This ability of being able to choose a particular desired coercivity over such a range of values is critically important for data processing uses. This is so because the utilization of these magnetic films of cobalt, iron, nickel alloys of cobalt and iron, alloys of cobalt and nickel, or alloys of iron and nickel as magnetic recording surfaces requires that they be fabricated so as to possess a predetermined coercivity and thereby function as tapes, loops, drums, discs and the like. The desired coercivity for a particular application may vary substantially from that of other applications.

The preferred method for fabricating a high coercivity magnetic recording thin film is to use all of the supplementary coercivity increasing methods. The method includes first depositing a ferromagnetic layer at a high angle of incidence by a series of short bursts, then cooling the deposited layer to room temperature by exposing the layer to air after the layer has cooled to about 60 degrees, then vacuum depositing by a series of bursts a second ferromagnetic layer again at a high incidence angle onto the first layer and finally cooling the second layer to room temperature in a non-oxidizing atmosphere. The overall preferred magnetic film thickness is between about 400 and 3000 angstroms. This method produces the highest coercivities possible. Coercivities have been observed as high as 1100 oersteds using this technique.

The following examples are included merely to aid in the understanding of the invention and variations may be made by one skilled in the art without departing from the spirit of the invention.

*Example 1*

An apparatus similar to the FIGURE 1 apparatus was used except that the film was held stationary and the vessel type induction heater was replaced with a tungsten resistance filament. Onto the resistance filament was placed 10 grams of high purity iron in several pieces. The substrate was a polyethylene terephthalate film. The vacuum chamber was evacuated to $2.0\times10^{-5}$ millimeters of mercury. The metal was heated for 15 minutes at a relatively low temperature to allow for out-gassing of all impurities before the actual evaporation was to take place. The substrate was so placed that the volatilized metal stream would strike the substrate at 80 degrees angle of incidence from the normal to the substrate. The shield was moved so that the opening for the volatilized stream of metal was in position to allow for the desired flow of volatized metal. The temperature of the filament was increased and the iron completely evaporated in approximately 30 seconds. The highest substrate temperature was 245° C. The evaporated film was allowed to cool in the chamber for 3 minutes until its temperature was below 60° C. The film was continuous and bright in appearance. The coercivity taken parallel to the incident plane was 150 oersteds.

*Example 2*

The Example 1 was repeated using high purity iron metal except instead of a single stream of volatilized metal being applied to the polyethylene terehpthalate film substrate, the current was applied to the resistance filament so that a series of four 5-second successive bursts of volatilized metal were applied to the substrate. The film was continuous and bright in appearance. The sample was allowed to cool for about 5 minutes in the chamber until it reached a temperature of approximately 50° C. Air was then allowed into the chamber. The coercivity parallel to the incident plane was 268 oersteds.

*Example 3*

Several pieces of high purity cobalt metal were weighed out totalling a weight of 10 grams. These pieces were laid upon the resistive filament in the vacuum chamber as described in the previous examples. The vacuum was reduced to approximately $2\times10^{-5}$ millimeters of mercury and the sample was out-gassed according to the procedure of Example 1. A film of polyethylene terethphalate was used as a substrate and it was placed so that its normal was 80 degrees to the vacuum evaporation metal stream. A series of six 5-second successive bursts evaporated most of the cobalt and condensed part of the evaporated cobalt onto the substrate. The coated substrate was cooled by opening the chamber to air after three minutes when the magnetic layer had reached a temperature of about 60° C. The film was excellent in appearance. The substrate had a variation in thickness because it was stationary rather than moving as illustrated in FIGURE 1. The thickest portion was $4.65\times10^{-3}$ emu or 420 angstrom units and the thinnest coating was $2.7\times10^{-3}$ emu or 245 angstrom units. The thickest coating had a coercivity of 355 oersteds and the thinnest coating had a coercivity of 219 oersteds taken parallel to the incident plane.

*Example 4*

Several pieces of high purity cobalt were weighed out and totalled a weight of 10 grams. The pieces were positioned on the resistance filament, the chamber was evacuated to a pressure of $1.2\times10^{-5}$ millimeters of mercury, and the cobalt metal was out-gassed according to the procedure of the Example 1. The angle of incidence was set at 80 degrees. A polyethylene terethphalate film of 5-mil thickness was used as a substrate. The evaporation took the form of six 5-second bursts of cobalt which evaporated most of the metal. Air was allowed to the chamber after about 3 minutes when the film temperature was about 60° C. The film temperature was reduced to room temperature. Another 10 grams of cobalt was placed upon the filament. The air was then evacuated from the chamber. A second series of six 5-second bursts of volatilized metal was then directed at and condensed onto the surface of the first layer. The angle of incidence was 80 degrees. The vacuum deposited second layer was allowed to cool within the evacuated chamber for 5 minutes until the temperature was below about 50° C. The air was allowed to enter the chamber. The film was excellent in appearance. The coercivity of the film taken parallel to the incident plane was 240 oersteds at $5.5\times10^{-3}$ emu or 500 angstrom units and 1000 oersteds at $9.9\times10^{-3}$ emu or 900 angstrom units.

*Example 5*

The apparatus of FIGURE 1 was used to vacuum deposit a cobalt film on a 100-foot length of polyethylene terephthalate film. An 80-degree angle of incidence of the vacuum deposit to the film was used. The vacuum chamber was evacuated to approximately $2\times10^{-5}$ millimeters of mercury. The cobalt metal was out-gassed by heating it at a low temperature for about 15 minutes. The shield 60 was moved so that the opening for the volatilized stream of metal was in the desired position. The temperature of the cobalt in vessel 32 was increased to the point where the cobalt metal was evaporating. The tape was then driven past the aperture in the shield 60 a total of 5 passes at a speed of 30 feet per minute. The deposited film was continuous and bright in appearance. The magnetic film thickness was 400 angstrom units. The resulting magnetic tape had in the plane of incidence a coercivity of 1099 oersteds and a squareness ratio $M_r/M_s$ of 0.91. The magnetic tape had in the plane perpendicular to the incident plane a coercivity of 378 oersteds and a squareness ratio $M_r/M_s$ of 0.56.

While the invention has been particularly shown and described with reference to the preferred embodiments thereof, it will be understood by those skilled in the art that the foregoing and other advantages in form and detail may be made therein without departing from the spirit and scope of the invention.

What is claimed is:

1. The method of fabricating a high coercivity magnetic recording member comprising:

heating a body of ferromagnetic metal in a vacuum to a temperature sufficiently high to volatilize the said metal;

directing and condensing said volatilized metal onto a suitable substrate at an angle of incidence of greater than about 45 degrees from the normal to the said substrate to form a condensed ferromagnetic metal layer; and cooling said condensed metal to room temperature.

2. The method of fabricating a high coercivity magnetic recording member comprising:

intermittently heating a body of ferromagnetic metal in a vacuum to a temperature sufficiently high to volatilize the said metal in bursts;

directing and condensing said volatilized metal onto a suitable substrate at an angle of incidence of greater than about 45 degrees from the normal to the said substrate to form a condensed ferromagnetic metal layer; and cooling said condensed metal layer to room temperature.

3. The method of fabricating a high coercivity magnetic recording member comprising:

heating a body of ferromagnetic metal in a vacuum to a temperature sufficiently high to volatilize the said metal;

simultaneously heating a body of non-ferromagnetic material in said vacuum to a temperature sufficiently high to volatilize said material;

simultaneously directing and condensing said volatilized metal and non-ferromagnetic material onto a suitable substrate at an angle of incidence of greater than about 45 degrees from the normal to the said substrate to form a condensed ferromagnetic layer with a non-ferromagnetic material dispersed throughout its body; and cooling said condensed layer to room temperature.

4. The method of fabricating a high coercivity magnetic recording member comprising:

heating in a vacuum a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal;

directing and condensing said volatilized metal onto a suitable substrate at an angle of incidence of greater than about 45 degrees from the normal to the said substrate to form a condensed ferromagnetic metal layer;

the thickness of said condensed metal layer being less than about 5000 angstrom units; and cooling said condensed metal layer to room temperature.

5. A magnetic recording member made by the method of claim 4.

6. The method of fabricating a high coercivity magnetic recording member comprising:

intermittently heating in a vacuum a body of ferromagnetic metal from the group consisting of cobalt, iron, nickel, cobalt-iron alloys, cobalt-nickel alloys, and a nickel-iron alloy between about 1 to 74 and 86 to 99 percent by weight nickel and the remaining portion iron to a temperature sufficiently high to volatilize the said metal in bursts;

directing and condensing said volatilized metal onto a suitable substrate at an angle of incidence of greater than about 45 degrees from the normal to the said substrate to form a condensed ferromagnetic metal layer;

the thickness of said condensed metal layer being less than about 5000 angstrom units; and cooling said condensed metal layer to room temperature.

7. The method of fabricating a high coercivity magnetic recording member comprising:

heating in a vacuum a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal;

simultaneously heating a body of sulfur in said vacuum to a temperature sufficiently high to volatilize said material;

simultaneously directing and condensing said volatilized metal and sulfur onto a suitable substrate at an angle of incidence of greater than 45 degrees from the normal to the said substrate to form a condensed ferromagnetic metal and sulfur layer; and cooling said condensed layer to room temperature.

8. The method of fabricating a high coercivity magnetic recording member comprising:

heating in a vacuum a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal;

directing and condensing said volatilized metal onto a suitable substrate at an angle of incidence of between about 60 and 85 degrees from the normal to the said substrate to form a condensed ferromagnetic metal layer;

the thickness of said condensed metal layer being between about 400 and 3000 angstrom units; and cooling said condensed metal layer to room temperature.

9. The method of fabricating a high coercivity magnetic recording member comprising:

heating in a vacuum a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal;

simultaneously heating a body of sulfur in said vacuum to a temperature sufficiently high to volatilize said material;

simultaneously directing and condensing said volatilized metal and sulfur onto a suitable substrate at an angle of incidence of between about 60 and 85 degrees from the normal to the said substrate to form a condensed ferromagnetic metal and sulfur layer;

the amount of sulfur evaporated being so controlled that the said condensed layer contains between about 0.5 and 4.0 percent by weight sulfur; and cooling said condensed layer to room temperature.

10. A magnetic recording member made by the method of claim 9.

11. The method of fabricating a high coercivity magnetic recording member comprising:

intermittently heating in a vacuum a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal in bursts;

directing and condensing said volatilized metal onto a suitable substrate at an angle of incidence of between about 60 to 85 degrees from the normal to the said substrate to form a condensed ferromagnetic metal layer;

the thickness of said condensed metal layer being less than about 5000 angstrom units; and cooling said condensed metal layer to room temperature with air after the temperature of said layer has decreased to less than about 60° C. in said vacuum.

12. The method of fabricating a high coercivity magnetic recording member comprising:

vacuum depositing a first ferromagnetic layer onto a suitable substrate by heating a body of ferromagnetic metal to volatilize the said metal, and directing and condensing said metal onto said substrate at an angle of incidence of greater than about 45 degrees from the normal to the said substrate;

cooling said deposited first layer to room temperature;

vacuum depositing a second ferromagnetic layer onto said first layer by heating a body of ferromagnetic metal to volatilize the said metal, and directing and condensing said metal onto said first layer at an angle of incidence of greater than about 45 degrees from the normal to the said substrate; and cooling said deposited second layer substantially to room temperature in a non-oxidizing atmosphere.

13. The method of fabricating a high coercivity magnetic recording member comprising:

vacuum depositing a first ferromagnetic layer onto a suitable substrate by heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal, and directing and condensing said metal onto said substrate at an angle of incidence greater than about 45 degrees from the normal to the said substrate;

cooling said deposited first layer to room temperature;

vacuum depositing a second ferromagnetic layer onto said first layer by heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal, and directing and condensing said metal onto said first layer at an angle of incidence greater than about 45 degrees from the normal to the said substrate; and cooling said deposited second layer substantially to room temperature in a non-oxidizing atmosphere.

14. A magnetic recording member made by the method of claim 13.

15. The method of fabricating a high coercivity magnetic recording member comprising:

vacuum depoisting a first ferromagnetic layer onto a suitable substrate by intermittently heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature suffiicently high to volatilize the said metal in bursts, and directing and condensing said bursts of volatilized metal onto said substrate at an angle of incidence greater than about 45 degrees from the normal to the said substrate;

cooling said deposited first layer to room temperature;

vacuum depositing a second ferromagnetic layer onto said first layer by intermittently heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal in bursts, and directing and condensing said bursts of volatilized metal onto said first layer at an angle of incidence greater than about 45 degrees from the normal to the said substrate; and cooling said deposited second layer substantially to room temperature in a non-oxidizing atmosphere.

16. The method of fabricating a high coercivity magnetic recording member comprising:

vacuum depositing a first ferromagnetic layer onto a suitable substrate by heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal, and directing and condensing said metal onto said substrate at an angle of incidence of 60 to 85 degrees from the normal to the said substrate;

cooling said deposited first layer to room temperature;

vacuum depositing a second ferromagnetic layer onto said first layer by heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal, and directing and condensing said metal onto said first layer at an angle of incidence of 60 to 85 degrees from the normal to the said substrate;

the combined thickness of the said condensed metal layers being less than about 5000 angstrom units; and cooling said deposited second layer substantially to room temperature in a non-oxidizing atmosphere.

17. The method of fabricating a high coercivity magnetic recording member comprising:

vacuum depositing a first ferromagnetic layer onto a suitable substrate by intermittently heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal in bursts, and directing and condensing said bursts of volatilized metal onto said substrate at an angle of incidence of 60 to 85 degrees from the normal to the said substrate;

cooling said deposited first layer to at least about 60° C. in an inert environment prior to exposing the layer to air;

vacuum depositing a second ferromagnetic layer onto said first layer by intermittently heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal in bursts, and directing and condensing said bursts of volatilized metal onto said first layer at an angle of incidence of 60 to 85 degrees from the normal the said substrate;

the combined thickness of the said condensed metal layers being less than about 5000 angstrom units; and cooling said deposited second layer substantially to room temperature in a non-oxidizing atmosphere.

18. The method of fabricating a high coercivity magnetic recording member comprising:

vacuum depositing a first ferromagnetic layer onto a substrate by intermittently heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal in bursts, and directing and condensing said bursts of volatilized metal onto said substrate at an angle of incidence of 60 to 85 degrees from the normal to the said substrate;

cooling said deposited first layer to at least about 60° C. in an inert environment prior to exposing the layer to air;

vacuum depositing a second ferromagnetic layer onto said first layer by intermittently heating a body of ferromagnetic metal from the group consisting of cobalt, iron, nickel, cobalt-iron alloys, cobalt-nickel alloys and a nickel-iron alloy between about 1 to 74 and 86 to 99 percent by weight nickel and the remaining portion iron to a temperature sufficiently high to volatilize the said metal in bursts, and directing and condensing said bursts of volatilized metal onto said first layer at an angle of incidence of 60 to 85 degrees from the normal to the said substrate;

the combined thickness of the said condensed metal layers being between about 400 and 3000 angstrom units; and cooling said deposited second layer substantially to room temperature with air after the temperature of said second layer has decreased to less than about 60° C. in said vacuum chamber.

References Cited

UNITED STATES PATENTS

| | | | |
|---|---|---|---|
| 2,853,402 | 9/1958 | Blois | 117—240 X |
| 2,999,766 | 9/1961 | Ashworth et al. | 117—236 X |
| 3,047,423 | 7/1962 | Eggenberger et al. | 117—107 X |
| 3,065,105 | 7/1962 | Pohn | 117—236 X |

ALFRED L. LEAVITT, *Primary Examiner.*

A. GOLIAN, *Assistant Examiner.*